(12) United States Patent
Garini

(10) Patent No.: US 6,552,794 B2
(45) Date of Patent: Apr. 22, 2003

(54) OPTICAL DETECTION METHOD FOR IMPROVED SENSITIVITY

(75) Inventor: Yuval Garini, Doar Na Misgav (IL)

(73) Assignee: Applied Spectral Imaging Ltd., Migdal Haemek (IL)

( * ) Notice: Subject to any disclaimer, the term of this patent is extended or adjusted under 35 U.S.C. 154(b) by 46 days.

(21) Appl. No.: 09/824,684

(22) Filed: Apr. 4, 2001

(65) Prior Publication Data

US 2002/0176084 A1 Nov. 28, 2002

(51) Int. Cl.⁷ .............................................. G01N 21/55
(52) U.S. Cl. ...................... 356/445; 356/244; 356/246; 356/440; 356/446
(58) Field of Search ................................ 356/244, 246, 356/440, 445, 446, 311, 326, 319; 250/483.1, 484.2, 486.1, 488.1, 216

(56) References Cited

U.S. PATENT DOCUMENTS

| | | | | |
|---|---|---|---|---|
| 4,930,890 A | * | 6/1990 | Hara et al. ................ 356/241.1 |
| 4,977,326 A | * | 12/1990 | Murata ..................... 250/483.1 |
| 5,036,208 A | * | 7/1991 | Murata et al. ............ 250/483.1 |
| 5,055,737 A | * | 10/1991 | Murata et al. ............ 250/483.1 |
| 5,162,160 A | * | 11/1992 | Matsui et al. .................. 156/67 |
| 5,777,732 A | * | 7/1998 | Hanninen et al. ......... 250/459.1 |
| 6,088,097 A | * | 7/2000 | Uhl .......................... 250/458.1 |
| 6,254,831 B1 | * | 7/2001 | Barnard et al. ........... 250/458.1 |

FOREIGN PATENT DOCUMENTS

WO WO 200216911 A1 * 2/2002 ........... G01N/21/64

* cited by examiner

Primary Examiner—Michael G. Lee
Assistant Examiner—Uyen-Chau N. Le
(74) Attorney, Agent, or Firm—G.E. Ehrlich Ltd.

(57) ABSTRACT

A light reflecting article is disclosed. The light reflecting article comprises a sample carrying article layered with a light reflecting layer. The light reflecting layer serves for allowing an optical collection and detection system to collect both luminescent light emitted from a sample positioned on the light reflecting article in a direction of the optical collection and detection system, as well as luminescent light emitted from the sample in a direction away from the optical collection and detection system and reflected in the direction of the optical collection and detection system via the light reflecting layer, thereby increasing a sensitivity of luminescent light detection.

33 Claims, 5 Drawing Sheets

OPTICAL DETECTION METHOD FOR IMPROVED SENSITIVITY

FIELD AND BACKGROUND OF THE INVENTION

The present invention relates to a method and an article for improving optical detection and sensitivity. More particularly, the present invention relates to a method and an article for improving optical detection and sensitivity in situations in which emission of fluorescence light is monitored.

Optical detection is used intensively in many fields and for a variety of applications. In many cases, the optical signal emitted by or from a viewed or analyzed object is very low, on the border of detection. Vast efforts are therefore directed at increasing the sensitivity of detection of optical and electro-optical systems, or, in other words, at increasing the ability of optical or electro-optical systems to detect light signals of lesser intensity.

Fluorescence microscopy provides an example. Fluorescence microscopy is one of the most powerful techniques for analyzing tissues and cells [J. S. Ploem (1987) Introduction to Fluorescence Microscopy, Oxford Science Publications, New York]. Unlike bright field microscopy where light is transmitted through an analyzed sample, in fluorescence microscopy, a signal appears only with respect to specific entities that emit light, whereas the background is left dark. This fact makes fluorescence microscopy a very sensitive method for detecting both the existence and distribution of materials in a sample and their quantities. Fluorescence microscopy is therefore one of the most important experimental methods used in light microscopy [Lakowicz (1983) Principles of fluorescence spectroscopy, Plenum Press, New York, London].

Thus, in fluorescence microscopy, an analyzed sample is emitting light, a phenomenon known as fluorescence. The fluorescence light can be native to the analyzed sample, or it can be as a result of an interaction between the analyzed sample and a probe. Some probes are chemicals that fluoresce under certain conditions. For example, probes are known that chemifluoresce differently according to a level of a chemical, e.g., an ion, such as hydrogen or calcium ions, present in the sample or portions thereof. Such probes are therefore useful in determining the concentration and/or distribution of a particular ion in the sample. Other probes include a binding portion and a fluorescent tag. The binding portion can be, for example, a first member of a binding pair, capable of binding a second member of a binding pair present in the sample. The members of a binding pair can be, for example, a ligand that binds a receptor and vice versa, an antibody that binds an antigen and vice versa, a nucleic acid that binds it complement, a substrate, product, inhibitor or analog that binds its enzyme and vice versa, etc. The fluorescent tag is typically a fluorochrome covalently linked to the first member of a binding pair and serves to monitor binding to the second member of the binding pair present in the analyzed sample. Many fluorochromes are presently known each is characterized by a unique absorption spectrum and absorption peak and emission spectrum and peak. Examples of fluorochromes include, fluorescent proteins, such as green, yellow, cian and red fluorescent proteins and smaller chemical compounds such as fluorescein-5-isothiocyanate (FITC), rodamine, SpectrumOrange™, SpectrumGreen™, Aqua, Texas-Red, 4',6-diamidino-2-phenylindole (DAPI), Cy3, Cy5.5. Hundreds of other fluorochromes are known. A partial list of commercially available fluorochromes can be found in the catalog of Molecular Probes. For a detailed review of fluorescent probes see, Mason (editor) (1993) Fluorescent and Luminescent Probes for Biological Activity, Biological Techniques Series, edited by Sattelle, Academic Press Limited, London; Waggoner (1986) Applications of fluorescence in the biomedical sciences, Eds. Taylor et al., New York: Alan R. Liss, Inc. pp. 3–28; and Taylor et al. (1992) The New Vision of Light Microscopy, American Scientist, Vol. 80, pp. 322–335.

In the last few years, further advances have been made in both the detection methods and the fluorochromes. Side by side with the development of fluorochromes that are brighter, more stable and easier to attach to different other compounds, other fluorescent materials have been developed commonly called quantum dots or nanocrystals [see, Bruchez et al (1998) Semiconductor nanocrystals as fluorescent biological labels. Science 281, 2013–2016 and Chan, W. C. et al (1998) Quantum dot bioconjugates for ultrasensitive nonisotopic detection. Science 281, 2016–2018]. These structures are in effect nanosized semiconductors that fluoresce. These structures are far more stable than organic-materials based fluorochromes, and in addition, it is possible to design and manufacture the nanocrystals so that they emit light at a desired spectral range and with a narrower bandwidth.

Improvements were also introduced in the detection of fluorescence. Imaging microscopy employing highly sensitive charge coupled devices (CCD) are used intensively and improve many aspects of detection, including, but not limited to, higher sensitivity, larger number of probes that can be co-detected, accurate quantitative analysis and automation. In addition, confocal microscopy which employs laser scanning mechanisms combined with confocal optics that improves the accuracy in the depth of field is also intensively used [see, Wlison, T. (1990) Confocal Microscopy. Academic Press, London]. These detection methods have broadened the use of fluorescence microscopy.

Fluorescent microscopy was improved to allow detection of different probes simultaneously. A remarked improvement in multicolor fluorochromes is the introduction of combinatorial fluorochromes which are various combinations of few basic fluorochromes [see, Ried et al., (1992) Simultaneous visualization of seven different DNA probes by in situ hybridization using combinatorial fluorescence and digital imaging microscopy. Proc. Natl. Acad. Sci. USA 89, 1388–1392; and, Ried (Jan. 1994) Fluoreszenz in situ Hybridizierung in der genetischen Diagnostik, Faculty of theoretical medicine, Ruprecht-Karls University Heidelberg].

Spectral imaging combined with fluorescence microscopy provides an even better spectral resolution and is presently developed to allow simultaneous detection of several dozens of different combinatorial fluorochromes.

A spectrometer is an apparatus designed to accept light, to separate (disperse) it into its component wavelengths, and measure the lights spectrum, that is the intensity of the light as a function of its wavelength. A spectral imaging device, also referred to herein as "imaging spectrometer" is a spectrometer which collects incident light from a scene and measures the spectra of each picture element thereof.

Spectroscopy is a well known analytical tool which has been used for decades in science and industry to characterize materials and processes based on the spectral signatures of chemical constituents therein. The physical basis of spectroscopy is the interaction of light with matter. Traditionally, spectroscopy is the measurement of the light intensity emitted, scattered or reflected from or transmitted through a sample, as a function of wavelength, at high spectral resolution, but without any spatial information.

Spectral imaging, on the other hand, is a combination of high resolution spectroscopy and high resolution imaging (i.e., spatial information). Most of the works so far described in spectral imaging concern either obtaining high spatial resolution information from a biological sample, yet providing only limited spectral information, for example, when high spatial resolution imaging is performed with one or several discrete band-pass filters [See, Andersson-Engels et al. (1990) Proceedings of SPIE—Bioimaging and Two-Dimensional Spectroscopy, 1205, pp. 179–189], or alternatively, obtaining high spectral resolution (e.g., a full spectrum), yet limited in spatial resolution to a small number of points of the sample or averaged over the whole sample [See for example, U.S. Pat. No. 4,930,516, to Alfano et al.].

Conceptually, a spectral imaging system comprises (i) a measurement system, and (ii) an analysis software. The measurement system includes all of the optics, electronics and the manner in which the sample is illuminated (e.g., light source selection), the mode of measurement (e.g., fluorescence or transmission), as well as the calibration best suited for extracting the desired results from the measurement. The analysis software includes all of the software and mathematical algorithms necessary to analyze and display important results in a meaningful way.

Spectral imaging has been used for decades in the area of remote sensing to provide important insights in the study of Earth and other planets by identifying characteristic spectral absorption features originating therefrom. However, the high cost, size and configuration of past remote sensing spectral imaging systems (e.g., Landsat, AVIRIS) has limited their use to air and satellite-born applications [See, Maymon and Neeck (1988) Proceedings of SPIE—Recent Advances in Sensors, Radiometry and Data Processing for Remote Sensing, 924, pp. 10–22; Dozier (1988) Proceedings of SPIE—Recent Advances in Sensors, Radiometry and Data Processing for Remote Sensing, 924, pp. 23–30].

There are three basic types of spectral dispersion methods that might be considered for a spectral imaging system: (i) spectral grating or prism, (ii) spectral filters and (iii) interferometric spectroscopy.

In a grating or prism (i.e., monochromator) based systems, also known as slit-type imaging spectrometers, such as for example the DILOR system: [see, Valisa et al. (Sep. 1995) presentation at the SPIE Conference European Medical Optics Week, BiOS Europe 1995, Barcelona, Spain], only one axis of a CCD (charge coupled device) array detector (the spatial axis) provides real imagery data, while a second (spectral) axis is used for sampling the intensity of the light which is dispersed by the grating or prism as function of wavelength. The system also has a slit in a first focal plane, limiting the field of view at any given time to a line of picture elements. Therefore, a full image can only be obtained after scanning the grating (or prism) or the incoming beam in a direction parallel to the spectral axis of the CCD in a method known in the literature as line scanning. The inability to visualize the two-dimensional image before the whole measurement is completed, makes it impossible to choose, prior to making the measurement, a desired region of interest from within the field of view and/or to optimize the system focus, exposure time, etc. Grating and prism based spectral imaging devices are in use for remote sensing applications, because an airplane (or satellite) flying over the surface of the Earth provides the system with a natural line scanning mechanism.

It should be further noted that slit-type imaging spectrometers have a major disadvantage since most of the picture elements of one frame are not measured at any given time, even though the fore-optics of the instrument actually collects incident light from all of them simultaneously. The result is that either a relatively large measurement time is required to obtain the necessary information with a given signal-to-noise ratio, or the signal-to-noise ratio (sensitivity) is substantially reduced for a given measurement time. Furthermore, slit-type spectral imaging devices require line scanning to collect the necessary information for the whole scene, which may introduce inaccuracies to the results thus obtained.

Filters-based spectral dispersion methods can be further categorized into discrete filters and tunable filters. In these type of imaging spectrometers the spectral image is built by filtering the radiation for all the picture elements of the scene simultaneously at a different wavelength at a time by inserting, in succession, narrow or wider band pass filters in the optical path, or by electronically scanning the bands using acousto-optic tunable filters (AOTF) or liquid-crystal tunable filter (LCTF), see below. Similarly to the slit type imaging spectrometers equipped with a grating or prism as described above, while using conventional narrow-band filters-based spectral dispersion methods, most of the radiation is rejected at any given time. In fact, the measurement of the whole image at a specific wavelength is possible because all the photons outside the instantaneous wavelength being measured are rejected and do not reach the CCD.

Tunable filters, such as AOTFs and LCTFs have no moving parts and can be tuned to any particular wavelength in the spectral range of the device in which they are implemented. One advantage of using tunable filters as a dispersion method for spectral imaging is their random wavelength access; i.e., the ability to measure the intensity of an image at a number of wavelengths, in any desired sequence without the use of filter wheels. However, AOTFs and LCTFs have the disadvantages of (i) limited spectral range (typically, $\lambda 2\lambda_{min}$) while all other radiation that falls outside of this spectral range must be blocked, (ii) temperature sensitivity, (iii) poor transmission, (iv) polarization sensitivity, and (v) in the case of AOTFs an effect of shifting the image during wavelength scanning, demanding careful and complicated registration procedures thereafter.

All these types of filter and tunable filters-based systems have not been used successfully and extensively over the years in spectral imaging for any application, because of their limitations in spectral resolution, low sensitivity, and lack of easy-to-use and sophisticated software algorithms for interpretation and display of the data.

A method and apparatus for spectral analysis of images which have advantages in the above respects is disclosed in U.S. Pat. No. 5,539,517, which is incorporated by reference as if fully set forth herein, with the objective to provide a method and apparatus for spectral analysis of images which better utilizes all the information available from the collected incident light of the image to substantially decrease the required frame time and/or to substantially increase the signal-to-noise ratio, as compared to the conventional slit- or filter type imaging spectrometer, and does not involve line scanning. According to this invention, there is provided a method of analyzing an optical image of a scene to determine the spectral intensity of each picture element (i.e., region in the field of view which corresponds to a pixel in an image presenting same) thereof by collecting incident light from the scene; passing the light through an interferometer which outputs modulated light corresponding to a predetermined set of linear combinations of the spectral intensity of the light emitted from each picture element; focusing the light outputted from the interferometer on a detector array, scanning the optical path difference (OPD) generated in the interferometer for all picture elements independently and simultaneously and processing the outputs of the detector array (the interferograms of all picture elements separately) to determine the spectral intensity of each picture element thereof.

This method may be practiced by utilizing various types of interferometers wherein the optical path difference (OPD) is varied to build the interferograms by moving the entire interferometer, an element within the interferometer, or the angle of incidence of the incoming radiation. In all of these cases, when the scanner completes one scan of the interferometer, the interferograms for all picture elements of the scene are completed.

Apparatuses in accordance with the above features differ from the conventional slit- and filter type imaging spectrometers by utilizing an interferometer as described above, therefore not limiting the collected energy with an aperture or slit or limiting the incoming wavelength with narrow band interference or tunable filters, thereby substantially increasing the total throughput of the system. Thus, interferometer-based apparatuses better utilize all the information available from the incident light of the scene to be analyzed, thereby substantially decreasing the measurement time and/or substantially increasing the signal-to-noise ratio (i.e., sensitivity). The sensitivity advantage that interferometric spectroscopy has over the filter and grating or prism methods is known in the art as the multiplex or Fellgett advantage [see, Chamberlain (1979) The principles of interferometric spectroscopy, John Wiley and Sons, pp. 16–18 and p. 263].

In U.S. Pat. No. 5,748,162, which is incorporated by reference as if fully set forth herein, the objective was to provide spectral imaging methods for biological research, medical diagnostics and therapy, which methods can be used to detect spatial organization (i.e., distribution) and to quantify cellular and tissue natural constituents, structures, organelles and administered components such as tagging probes (e.g., fluorescent probes) and drugs using light transmission, reflection, scattering and fluorescence emission strategies, with high spatial and spectral resolutions.

Other uses of the spectral imaging device described in U.S. Pat. No. 5,539,517 are described in the U.S. Patent Nos. 6,088,099 "Method for interferometer based spectral imaging of moving objects", 6,075,599 "Optical device with entrance and exit paths that are stationary under device rotation"; 6,066,459 "Method for simultaneous detection of multiple fluorophores for in situ hybridization and multi-color chromosome painting and banding"; 6,055,325 "Color display of chromosomes or portions of chromosomes" 5,043,039 "Method of and composite for in situ fluorescent hybridization" 6,018,587 "Method for remote sensing analysis be decorrelation statistical analysis and hardware therefor"; 6,007,996 "In situ method of analyzing cells"; 5,995,645 "Method of cancer cell detection"; 5,991,028 Spectral bio-imaging methods for cell classification"; 5,936,731 "Method for simultaneous detection of multiple fluorophores for in situ hybridization and chromosome painting"; 5,912,165 "Method for chromosome classification by decorrelaiton statistical analysis and hardware therefore"; 5,906, 919 "Method for chromosomes classification"; 5,871,932 "Method of and composite for fluorescent in situ hybridization"; 5,856,871 "Film thickness mapping using interferometric spectral imaging"; 5,835,214 "Method and apparatus for spectral analysis of images"; 5,834,203 "Method for classification of pixels into groups according to their spectra using a plurality of wide band filters and hardware therefore"; 5,817,462 "Method for simultaneous detection of multiple fluorophores for in situ hybridization and multi-color chromosome painting and banding"; 5,798,262 "Method for chromosomes classification"; 5,784,162 "Spectral bio-imaging methods for biological research, medical diagnostics and therapy"; 5,719,024 "Method for chromosome classification by decorrelation statistical analysis and hardware therefore, all of which are incorporated herein by reference.

Spectral imaging systems are potentially useful in all applications in which subtle spectral differences exist between chemical constituents whose spatial distribution and organization within an image are of interest. The measurement can be carried out using virtually any optical system attached to the system described, for example, in U.S. Pat. No. 5,539,517, for example, an upright or inverted microscope, a fluorescence microscope, a macro lens, an endoscope and a fundus camera. Furthermore, any standard experimental method can be used, including light transmission (bright field and dark field), auto-fluorescence and fluorescence of administered probes, etc.

A typical scheme of the optical system of a fluorescent microscope is shown in FIG. 1. The microscope includes an objective lens 10, a light source 12 coupled to a condensor lens 14, a dichroic prism 15 including a exitation filter 16 which serves for illuminating an object 18 with a desired exitation light (solid lines) and an emission filter 17 which serves for transmitting fluorescent light (dashed lines) emitted from object 18 through an ocular lens 20 to an array of detectors 22, such as an eye or a CCD, or in the case of a confocal microscope, to a photomultiplier. In the later case there is also included a scanning mechanism that scans the image picture element by picture element in order to reconstruct an image (not shown).

FIG. 2 shows in more detail the optical path of the rays of light emitted from object 18 which is mounted on a mount 24 (e.g., a microscope slide). As can be seen, only rays that are emitted in the angles defined by a virtual cone 26 (darkened) of angle θ are actually collected by objective lens 10 and are therefore detected by the detector. The angle that spans cone 26 in space is defined by the numerical aperture (NA) of the microscope.

The brightness of an image formed by an objective at a fixed magnification increases with the diameter of the angular aperture (the angle θ of the cone of light collected by the objective). Light rays emanating from the object proceed through air (or an immersion medium such as oil) that lies between the cover glass and the objective front lens. The angular aperture is expressed as the angle between the microscope optical axis and the direction of the most oblique light rays captured by the objective. Mathematically, the numerical aperture is expressed as:

$$NA = n \times \sin\frac{\theta}{2} \qquad \text{Eq. 1}$$

where n is the refractive index of the media positioned between the sample and the objective front lens and θ is the angular aperture, see FIG. 2. The value of n varies between 1.0 for air and about 1.5 for a majority of immersion oils that are used in optical microscopy. The angular aperture is the maximum angle of light rays emanating from the specimen that the objective front lens can capture when the specimen is focused. From the Eq. 1 above, it is obvious that the numerical aperture increases with both angular aperture and the refractive index of the imaging medium.

Theoretically, the highest angular aperture obtainable with a standard microscope objective would be 180 degrees. The sine of 90 degrees is one, which indicates that the numerical aperture is limited not only by the angular aperture, but also by the imaging medium refractive index. A majority of microscope objectives are designed to operate with air (which has a refractive index of 1.0) as the imaging medium between the cover glass and the objective front lens. This yields a theoretical maximum numerical aperture of 1.00, but in actual practice, the highest numerical aperture for a dry objective is about 0.95 (the angular aperture half-angle equals approximately 72 degrees).

Every optical imaging system is diffraction limited by the wave-like nature of light. For an optical system such as a microscope, this limit is well described by the point spread function (PSF). This function describes the distribution of light in the image plane and optical axis as a result of a point light source. This theory is well developed and known, see for example, M. Born and E. Wolf, Principles of Optics 6th edition, Cambridge University Press (Cambridge) and R. H. Webb (1996), Confocal Optical Microscopy, Rep. Prog. Phys. 59 pp. 427–471.

The three-dimensional picture element spread function can be described as follows:

First, lets introduce two generalized variables u and v defined as:

$$u = \frac{2 \cdot \pi}{n\lambda} \cdot NA^2 \cdot z \quad \text{Eq. 2}$$

$$v = \frac{2 \cdot \pi}{\lambda} \cdot NA \cdot r \quad \text{Eq. 3}$$

where $\lambda$ is the wavelength of the light, z describe the distance from the focal point along the optical axis of the microscope and r is the radial distance from the optical axis in the focal plane. n, as before, is the index of refraction of the material in between the object and the front lens of the objective.

Second, the following Lommel functions is defined:

$$U_n(u, v) = \sum_{s=0}^{\infty} (-1)^s \left(\frac{u}{v}\right)^{n+2s} J_{n+2s}(v) \quad \text{Eq. 4}$$

$$V_n(u, v) = \sum_{s=0}^{\infty} (-1)^s \left(\frac{v}{u}\right)^{n+2s} J_{n+2s}(v) \quad \text{Eq. 5}$$

where the J(x) functions are the Bessel function of different integer order.

Third, the point spread function at (u,v) close to the image point of the microscope is:

$$I(u, v) = \left(\frac{2}{u}\right)^2 [U_1^2(u, v) + U_2^2(u, v)] \cdot I_0 \quad \text{or} \quad \text{Eq. 6}$$

-continued $$I(u, v) = \left(\frac{2}{u}\right)^2 \cdot \left[1 + V_0^2(u, v) + V_1^2(u, v) - 2V_0(u, v)\cos\left(\frac{1}{2}\left(u + \frac{v^2}{u}\right)\right) - 2V_1(u, v)\sin\left(\frac{1}{2}\left(u + \frac{v^2}{u}\right)\right)\right] \cdot I_0 \quad \text{Eq. 7}$$

where $I_0$ is the intensity of the point light source in the object plane. Even though the two functions are identical, they are required for performing the numerical calculation for different values of u and v.

This function can be calculated by using numerical evaluations of the Bessel function, see for example: W. H. Press et al (1997) Numerical Recepies in C 2nd edition. Cambridge University Press, New York.

An example of the result is shown in FIG. 3.

Along the optical axis, the PSF becomes rather simple, $$I(u, 0) = \left(\sin\frac{u}{4} / \frac{u}{4}\right)^2 \cdot I_0.$$

A different use of fluorescence detection is in the fields of (i) biological material carrying chips; and (ii) "lab-on-chip device". Biological material carrying chips are small articles including a micro-array of biological materials, such as, but not limited to, cells, phages, bacteria, nucleic acids, proteins, peptides or carbohydrates of a known or unknown nature attached thereto in known positions. A "lab-on-chip device" is a more complex chip device which includes an array of micro-vessels and optionally micro-tunnels, micro-valves and micro-pumps and therefore allows for the mixing of different reagents and execution of different reactions in the micro-vessels formed on or in the chip. In both cases, one of the preferred detection methods involves fluorescence light detection.

Other uses of the spectral imaging device described in U.S. Pat. No. 5,539,517 are described in the U.S. Pat. Nos. 6,088,099 "Method for interferometer based spectral imaging of moving objects"; 6,075,599 "Optical device with entrance and exit paths that are stationary under device rotation"; 6,066,459 "Method for simultaneous detection of multiple fluorophores for in situ hybridization and multicolor chromosome painting and banding"; 6,055,325 "Color display of chromosomes or portions of chromosomes"; 5,043,039 "Method of and composite for in situ fluorescent hybridization"; 6,018,587 "Method for remote sensing analysis be decorrelation statistical analysis and hardware therefor"; 6,007,996 "In situ method of analyzing cells"; 5,995,645 "Method of cancer cell detection"; 5,991,028 "Spectral bio-imaging methods for cell classification"; 5,936,731 "Method for simultaneous detection of multiple fluorophores for in situ hybridization and chromosome painting"; 5,912,165 "Method for chromosome classification by decorrelaiton statistical analysis and hardware therefore"; 5,906,919 "Method for chromosomes classification"; 5,871,932 "Method of and composite for fluorescent in situ hybridization"; 5,856,871 "Film thickness mapping using interferometric spectral imaging"; 5,835,214 "Method and apparatus for spectral analysis of images"; 5,834,203 "Method for classification of pixels into groups according to their spectra using a plurality of wide band filters and hardware therefore"; 5,817,462 "Method for simultaneous detection of multiple fluorophores for in situ hybridization and multicolor chromosome painting and banding"; 5,798,262 "Method for chromosomes classification"; 5,784,162 "Spectral bio-imaging methods for biological research, medical diagnostics and therapy"; and 5,719,024 "Method for chromosome classification by decorrelation statistical analysis and hardware therefore, all of which are incorporated herein by reference.

Fluorescence detection is acquiring major importance in a variety of technological fields. The desired level of detection, or in other words, the desired level of sensitivity, is increased as samples are becoming smaller and smaller. As an example, in detecting DNA arrays on chip in a process known as hybridization sequencing or in a process of evaluating gene expression, the question that has to be answered is not as simple as a yes/no question. The main issue is the extent to which every sequence is hybridized to as to determine a sequence or an expression level of a gene or genes. The higher the accuracy of measurement is, the more information will result and the more accurate the analysis will be. The detection system is one of the major limiting factors in this sense.

There is thus a great need for, and it would be highly advantageous to have an novel approach for fluorescence detection that will increase the sensitivity by which existing optics can detect fluorescence light.

SUMMARY OF THE INVENTION

According to one aspect of the present invention there is provided a light reflecting article comprising a sample carrying article being layered with a light reflecting layer, the light reflecting layer being for allowing an optical collection and detection system to collect both luminescent light emitted from a sample positioned on the light reflecting article in a direction of the optical collection and detection system, as well as luminescent light emitted from the sample in a direction away from the optical collection and detection system and reflected in the direction of the optical collection and detection system via the light reflecting layer, thereby increasing a sensitivity of luminescent light detection.

According to another aspect of the present invention there is provided a method of increasing a sensitivity of an optical collection and detection system in detecting luminescent light emitted from a sample, the method comprising positioning the sample on a light reflecting article, such that the optical collection and detection system collects both luminescent light emitted from a sample positioned on the light reflecting article in a direction of the optical collection and detection system, as well as luminescent light emitted from the sample in a direction away from the optical collection and detection system and reflected in the direction of the optical collection and detection system via the light reflecting article, thereby increasing a sensitivity of luminescent light detection.

According to further features in preferred embodiments of the invention described below, the light reflecting article is a microscopic slide.

According to still further features in the described preferred embodiments the light reflecting article is a chip to which biological material is bound.

According to still further features in the described preferred embodiments the biological material is selected from the group consisting of cells, phages, bacteria, nucleic acids, proteins, peptides and carbohydrates.

According to still further features in the described preferred embodiments the biological material is bound to the chip in array.

According to still further features in the described preferred embodiments the light reflecting article is a lab-on-chip device having a plurality of micro-vessels.

According to still further features in the described preferred embodiments the light reflecting article forms a part of a microscope stage.

According to still further features in the described preferred embodiments the light reflecting layer includes a mirror layer.

According to still further features in the described preferred embodiments the light reflecting layer includes an array of micro-retro-reflectors.

According to still further features in the described preferred embodiments the light reflecting layer includes a stack of thin light reflecting films.

According to still further features in the described preferred embodiments the light reflecting layer provides spectral reflection selected from the group consisting of a single band reflection, a double band reflection, a triple band reflection a multiple band reflection, a longpass reflection and a shortpass reflection.

According to still further features in the described preferred embodiments the optical collection and detection system is selected from the group consisting of a fluorescence microscope and a confocal microscope.

According to still further features in the described preferred embodiments the optical collection and detection system includes a scanable light source.

According to still further features in the described preferred embodiments the scanable light source emits coherent light.

According to still further features in the described preferred embodiments the optical collection and detection system includes an arc lamp.

According to still further features in the described preferred embodiments the optical collection and detection system includes a laser light source.

According to still further features in the described preferred embodiments the luminescent light emitted from the sample originates from aoutofluorescence of the sample.

According to still further features in the described preferred embodiments the luminescent light emitted from the sample originates from a fluorescent probe interacting with the sample.

According to still further features in the described preferred embodiments the luminescent light emitted from the sample originates from a chemifluorescent probe interacting with the sample, the chemifluorescent probe changes an intensity of its emission according to a concentration of a chemical present in the sample.

According to still further features in the described preferred embodiments the fluorescent probe includes a first member of a binding pair conjugated to a fluorescent tag.

According to still further features in the described preferred embodiments the first member of the binding pair is selected from the group consisting of a nucleic acid, a ligand, a receptor, an antigen, an antibody, an enzyme, a substrate, a substrate analog and an inhibitor.

According to still further features in the described preferred embodiments the fluorescent tag is selected from the group consisting of a fluorochrome, a quantum dot, a nanocrystal and a fluorescent protein.

According to still further features in the described preferred embodiments the luminescent light emitted from the sample includes a plurality of emission spectra.

According to still further features in the described preferred embodiments the luminescent light emitted from the sample includes a plurality of emission spectra.

According to still further features in the described preferred embodiments the luminescent light emitted from the sample includes a plurality of emission spectra originating from combinatorial labeling.

The present invention successfully addresses the shortcomings of the presently known configurations by providing an article and method for increasing the sensitivity of fluorescence detection.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
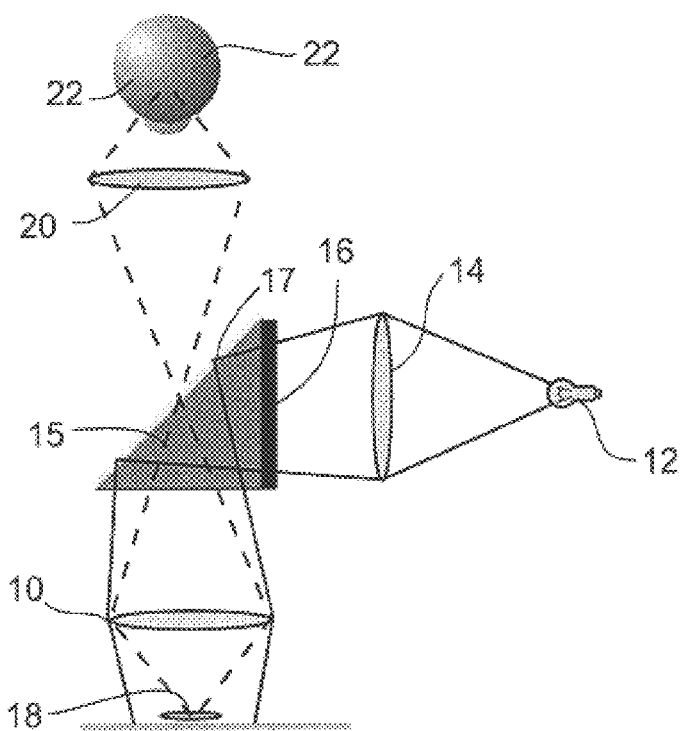
FIG. 1 is a schematic depiction of a typical prior art fluorescence microscope.
Figure 2:
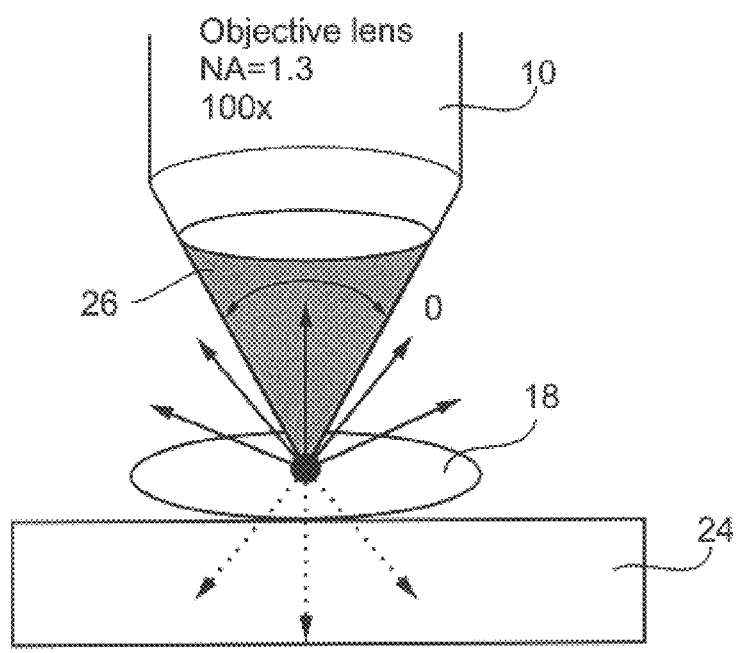
FIG. 2 is a schematic model of fluorescent rays emitted from a picture element of a fluorescing object viewed using a typical prior art fluorescence microscope.
Figure 3:
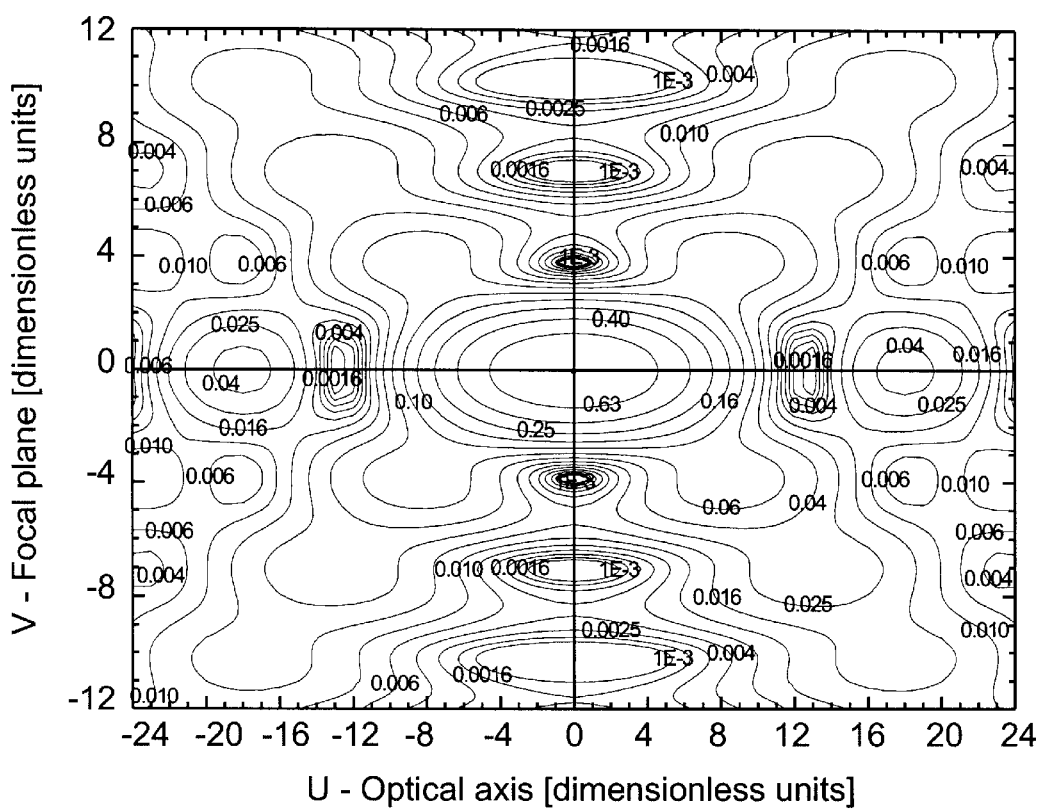
FIG. 3 shows point spread function curves (also called isophotes).

The present invention is of a method and a light reflecting article which can be used for improving optical detection and sensitivity. Specifically, the present invention can be used to improve optical detection and sensitivity in situations in which luminescence is monitored.

As used herein, the term "luminescence" refers to the emission of light not caused by incandescence and occurring at a temperature below that of incandescent bodies and includes, for example, fluorescence, autofluorescence, chemifluorescence, electroluminescence and chemiluminescence.

As used herein, the term "fluorescence" refers to the emission of light during exposure to external radiation such as light or x-rays.

As used herein, the term "autofluorescence" refers to self or natural fluorescence.

As used herein, the term "chemifluorescence" refers to the emission of light during interaction with a chemical in a response to external radiation.

As used herein, the term "electroluminescence" refers to the emission of light during exposure to an electrical field, voltage or current.

As used herein, the term "chemiluminescence" refers to the emission of light during interaction with a chemical.

The principles and operation of an article and method according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 4:
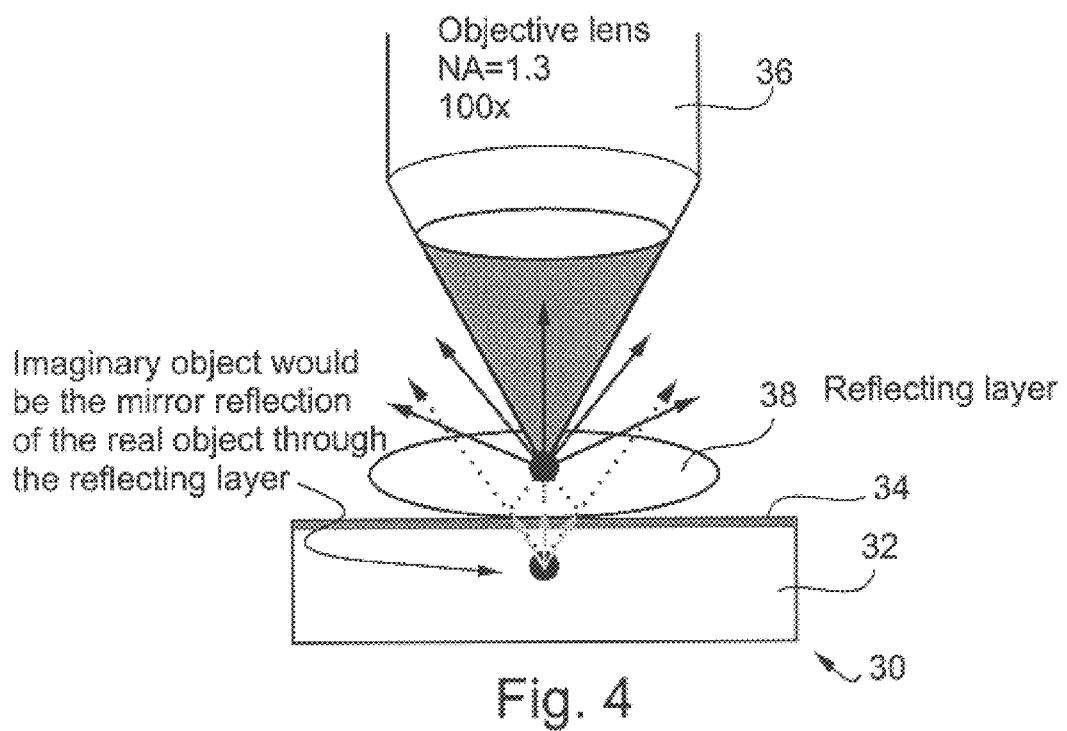
FIG. 4 shows a light reflecting article according to the present invention and it's use with an optical collection and detection system.

Referring now to the drawings, FIG. 4 illustrates a light reflecting article in accordance with the teachings of the present invention, which is referred to hereinbelow, as light reflecting article 30. Light reflecting article 30 comprises a sample carrying article 32, layered with a light reflecting layer 34. Light reflecting layer 34 serves for allowing an optical collection and detection system 36 to collect both luminescent light emitted from a sample 38 positioned on sample carrying article 30 in a direction of optical collection and detection system 36, as well as luminescent light emitted from sample 38 in a direction away from optical collection and detection system 36 and reflected in the direction of optical collection and detection system 36 via light reflecting layer 34, thereby increasing the sensitivity of luminescent light detection.

According to another aspect of the present invention there is provided a method of increasing a sensitivity of an optical collection and detection system in detecting luminescent light emitted from a sample. The method comprises positioning the sample on a light reflecting article, such that the optical collection and detection system collects both luminescent light emitted from a sample positioned on the light reflecting article in a direction of the optical collection and detection system, as well as luminescent light emitted from the sample in a direction away from the optical collection and detection system and reflected in the direction of the optical collection and detection system via the light reflecting article, thereby increasing the sensitivity of luminescent light detection.

Figure 5:
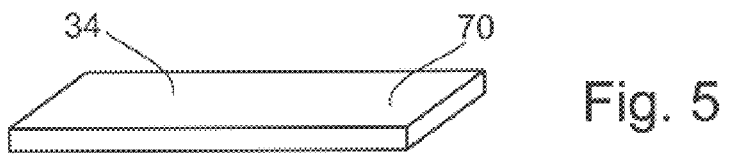
FIG. 5 shows a perspective view of a chip according to the present invention.

As shown in FIG. 5, light reflecting article 30 can be, for example, a microscope slide 40.

Figure 6:
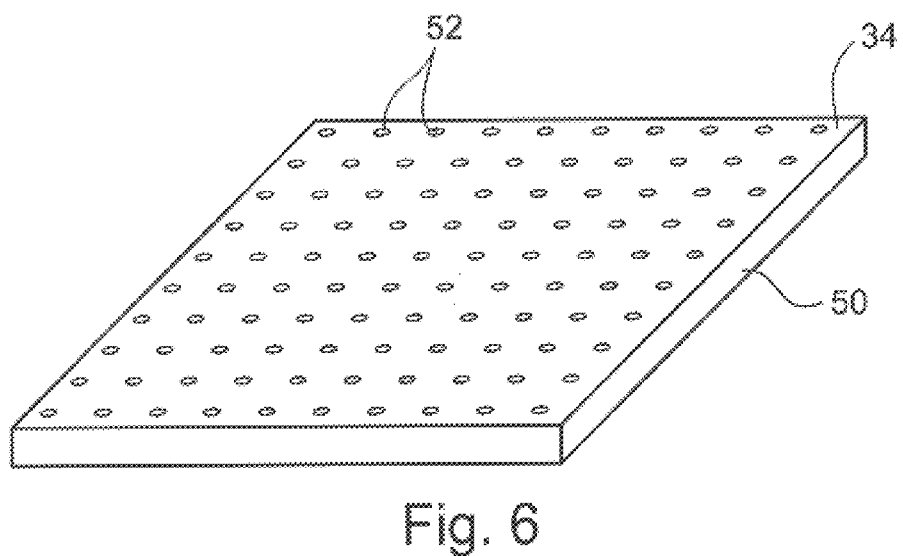
FIG. 6 shows a perspective view of a microscopic slide according to the present invention.

Alternatively, as shown in FIG. 6, light reflecting article 30 can be, for example, a chip 50 covered with reflective layer 34 to which biological material 52, such as, but not limited to, cells, phages, bacteria, nucleic acids, proteins, peptides or carbohydrates, is bound in, for example, an array arrangement. The biological material can be of a known nature (e.g., having a known sequence) or of an unknown nature.

Figure 7:
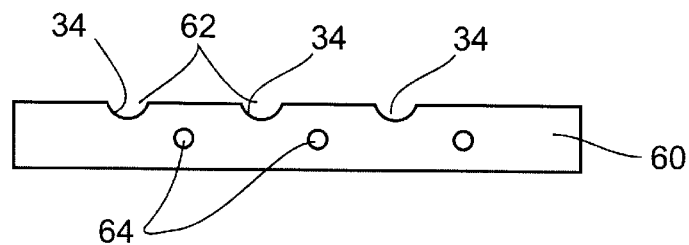
FIG. 7 shows a cross-sectional view of a lab-on-chip device according to the present invention.

Alternatively, as shown in FIG. 7, light reflecting article 30 can be, for example, a lab-on-chip device 60 having a plurality of micro-vessels 62 covered with reflective layer 34 and preferably also micro-tunnels 64, micro-valves and micro-pumps, which allow to control fluid tunneling to and out of micro-vessels 62.

Figure 8:
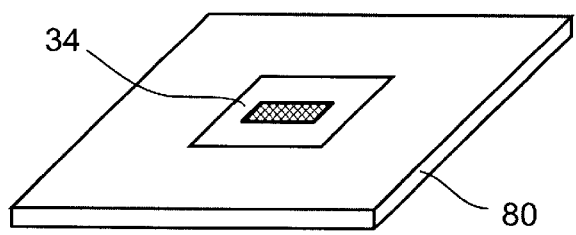
FIG. 8 shows a perspective view of a microscope stage according to the present invention.

Since in some cases sample 38 has a substantial thickness it is preferred, as shown in FIG. 4, that sample 38 will be positioned on the surface of article 30 which is covered by light reflecting layer 34, such that the luminescence and the reflected luminescence will have as close as possible focal planes. However, selecting article 30 thin enough, will allow positioning of sample 38 on the surface of article 30 which is not covered by light reflecting layer 34, depending of course on the degree of magnification provided by system 36 and other parameters which are further discussed in the Examples section that follows. Accordingly, as shown in FIG. 8, article 30 can form a part of a microscope stage 80, covered with reflective layer 34.

A few techniques are well known for the construction of light reflecting layers. Examples include metallic coatings and thin-film interference coatings. Thin-film coatings provide the most flexible performance. Interference coatings are composed of a stack of thin layers of materials, each having a thickness in the order of a wavelength of light (usually around a quarter of a wavelength of light). The interface of the waves that are reflected from the different layers selects that light that will be either transmitted or reflected.

Methods for designing the layers parameters (material, thickness and number of layers) are well known in the art. By adjusting the number of layers and the thickness of each layer, one can control the nominal wavelength, the bandwidth, and the blocking level (i.e., the percentage of undesired light that will pass or be reflected through the filter). One can also create more complex filters and coatings such as filters with multiple bands. The physics of thin film coatings and its properties are very well understood and documented. See for example, Michael Bass, Handbook of Optics I 2nd edition, Chapter 42: Optical Properties of films and coatings, J. A. Dobrowolski, pp. 42.1–42.130. McGraw-Hill Inc., which is incorporated herein by reference.

The performance of a thin film coating depends also on the angle of incidence of light. This issue, however, can be taken into consideration and the result can be a small change in the reflection or transmission characteristics. The difference can be in the order of few percentages change which is not important if the spectral bands that are of interest are sufficiently wide.

Different types and custom made reflecting filters are available, for example, by Chroma Technology Corp., 72 Cotton Mill Hill, Unit A9 Brattleboro Vt. 05301 USA and Omega Optical, Inc., 3 Grove Street, Brattleboro, Vt. 05302.

Figures 9, 10, 11:
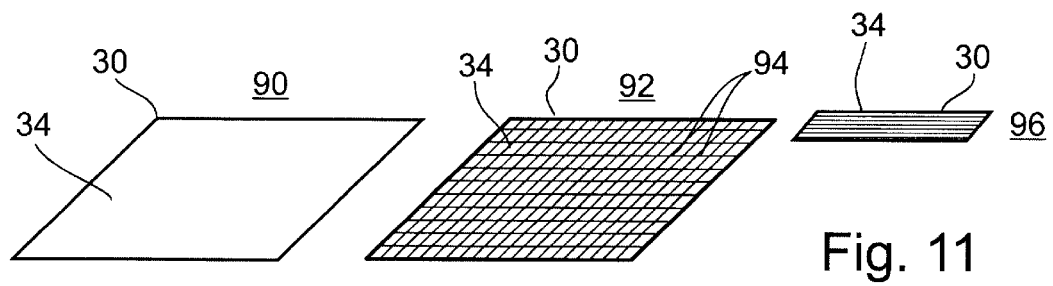
FIG. 9 shows a perspective view of a mirror layer according to the present invention.
FIG. 10 shows a perspective view of an array of micro retro-reflectors according to the present invention.
FIG. 11 shows a perspective view of a stack of thin light reflecting films according to the present invention.
Figure 12:
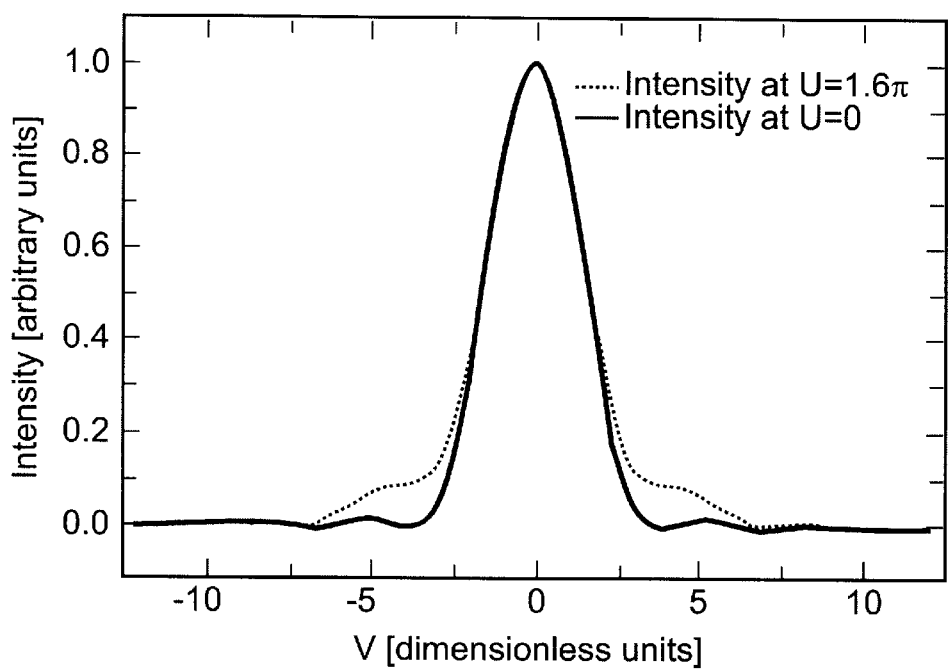
FIG. 12 demonstrates the PSF for an in-focus object (solid line) and its out of focus reflected object (dashed line) for the parameters described in Example 2. The difference is not large, and overall a significant increase in the detected intensity will result.
Figure 13:
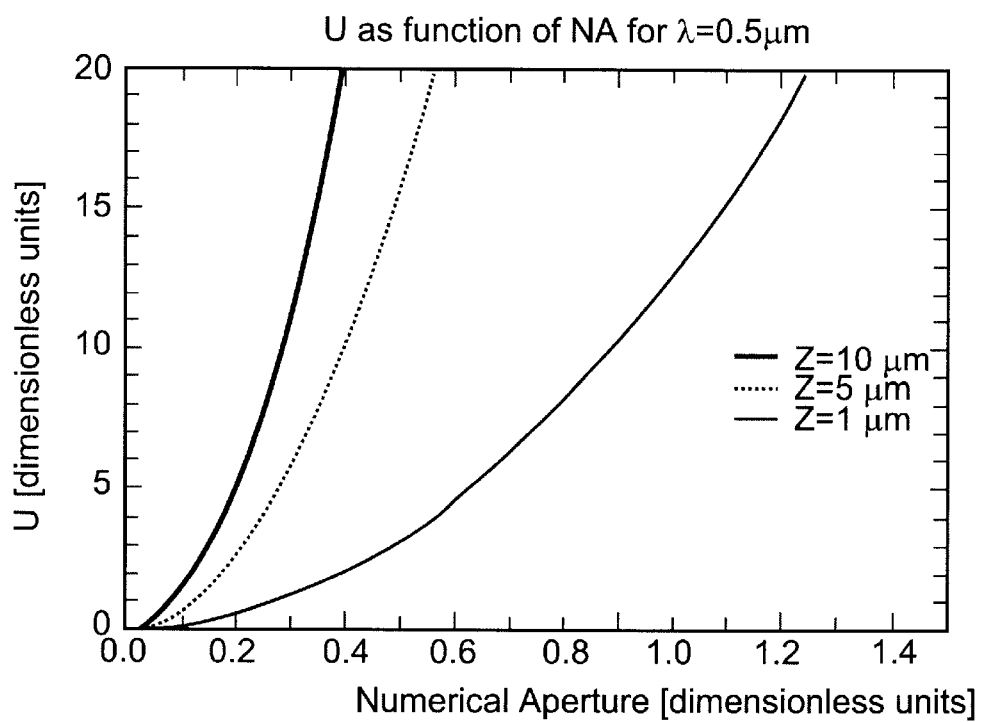
FIG. 13 demonstrates u calculated as a function of the numerical aperture for the out-of-focus reflected object when the object is in focus, wherein three plots are calculated for three different heights of the object above the reflecting surface. Note that, when u is smaller than about 12, the image intensity grows significantly. Note that there are conditions that will not enable an increase in the intensity, such as the case of NA=1.4 as explained in Example 2.

Thus, as shown in FIGS. 9–11, light reflecting layer 34 of article 30 of the present invention can acquire many alternative configurations. For example, light reflecting layer 34 can include a mirror layer 90 (FIG. 9), in which case it will reflect substantially all the light impinges thereon. In another configuration, light reflecting layer 34 includes an array 92 of micro-retro-reflectors 94 (FIG. 10), in which case it will again reflect substantially all the light impinges thereon. In yet another configuration, light reflecting layer 34 includes a stack of thin light reflecting films 96 (FIG. 11). In the later case, for example, layer 34 can be constructed so as to provide spectral reflection selected from the group consisting of a single band reflection, a double band reflection, a triple band reflection a multiple band reflection, a longpass reflection and/or a shortpass reflection.

Any optical collection and detection system can be used while implementing the present invention, including, but not limited to, a fluorescence microscope having an arc lamp such as a Xenon or Mercury lamp, a confocal microscope and an optical collection and detection system that includes a scanable light source, emitting, for example, coherent light, such as a laser light.

The luminescence emitted from the sample can be of a variety of sources and of a variety of types. In one example the luminescence emitted from the sample is autofluorescence. Many chemicals naturally present in living cells, for example, autofluoresce, including, but not limited to, certain amino acids, chlorophyll, NAD and NADH$^+$, to list some. In another example, the luminescent light emitted from the sample originates from a chemifluorescent probe interacting with the sample, the chemifluorescent probe changes an intensity of its emission according to a concentration of a chemical, such as an ion (e.g., Cat$^{++}$, H$^+$), present in the sample. In yet another example, the luminescent light emitted from the sample originates from a fluorescent probe interacting with the sample. The fluorescent probe includes, for example, a first member of a binding pair, such as, but not limited to, a nucleic acid, a ligand, a receptor, an antigen, an antibody, an enzyme, a substrate, a substrate analog and an inhibitor, conjugated to a fluorescent tag, such as, but not limited to, a fluorochrome, a quantum dot, a nanocrystal and a fluorescent protein, such as green fluorescent protein.

The sample may emit a single emission spectrum or alternatively, a plurality of emission spectra, originating, for example, from combinatorial labeling or hybridization. To this end, see, for example, U.S. Pat. No. 6,066,459, entitled, "Method for simultaneous detection of multiple fluorophores for in situ hybridization and multicolor chromosome painting and banding", which is incorporated herein by reference.

Thus, the basic concept underlying the present invention is to coat an article that holds a sample with a reflecting layer that reflects fluorescent signals emitted from the sample and directed away from a light collection and detection system in the direction of the light collection and detection system. This results in increased intensity that allows higher sensitivity. In theory it can result in doubling the intensity. Nevertheless, typically, the intensity gain is somewhat less that double, as will be explained below.

Implementing the present invention results in the formation of an imaginary object below the reflecting layer, the same distance as the object is above that layer (see FIG. 4). Taking into account the fact that the optical system is focused on a certain focal plane with some depth of field (that depends on the numerical aperture of the optical system), it is clear that the imaginary object will not be in exact focus. The severity of the out-of-focus phenomena depends on a couple of parameters, the most important of which being (i) the numerical aperture of the optical system; (ii) the size of the object; and (iii) the height of the object above the reflecting layer. In general, the lower the numerical aperture, the closer the object is to the reflecting layer and the bigger the size of the object would result in higher intensity being detected without image quality problems.

The present invention is particularly advantageous for procedures in which detection of fluorescence is pushed to its limits, such as, but not limited to, fluorescence in-situ hybridization (FISH), metaphase-FISH (M-FISH), spectral karyotyping (SKY), chip and lab-on-chip applications.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Reference is now made to the following examples, which together with the above descriptions, illustrate the invention in a non limiting fashion.

The following method was used in the following example: First, a set of parameters was selected. Second, parameter u was defined and for this parameter, based on Equation 6 (see Background section above), the distribution of the intensity arising from the reflected object was determined. Third, the determined distribution was compared with the distribution of intensity calculated for the real in-focus object. Fourth, the two distributions were compared.

Example 1

Assume an object size of 5 $\mu$m that emits green light ($\lambda$=0.5 $\mu$m) and lays 10 $\mu$m above a reflective surface. Assume that the optical detection system is a microscope with a magnification power of 4× and a numerical aperture of 0.2 (this is a typical numerical aperture for such a low magnification power). The distance between the real object and its reflection image is 20 $\mu$m. Substituting the parameters given above in equations 2 one finds that u=1.6·$\pi$. For this value, the radial symmetric distribution of the reflected object, I(1.6·$\pi$,v) is very similar relative to the in-focus real object. The PSF of these two is shown in FIG. 5.

FIG. 6 shows the value of u for the out-of-object reflected object when the object itself is in focus (i.e., for the object, u=0). The calculation was done for green light at ($\lambda$=0.5 $\mu$m) and for a few different distances of the object above the reflecting layer. As long as the value of u is smaller than about 12, the defocusing effect of the reflected object is not be too high, and a significant increase in the intensity thus results. The spatial resolution decreases as a result of the somewhat broader distribution of the intensity in the focal plane. The significance of this phenomenon depends also on the object size.

Example 2

Assume a small object in the order of 0.5 $\mu$m that emits green light ($\lambda$=0.5 $\mu$m) and lays 10 $\mu$m above a reflective surface. Assume also that the optical detection system is a microscope with a high magnification power of 100X and a numerical aperture (NA) of 1.4. In such a case, the distance between the real object and its mirror layer-reflection is 20 $\mu$m. Substituting the parameter given here in Equations 2 (see Background section) one finds that u=160·$\pi$. For this value, the radial symmetric distribution of I(160·$\pi$,v) is very large relative to the size of the object. Under these conditions, it will not be possible to focus both the real object and its reflection image and therefore it is substantially not possible to gain more light for this case.

The analysis made above shows that there is a large range in which implementing the present invention will increase the measurable intensity of luminescent light, and therefore the sensitivity of such a measurement will increase.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A light reflecting article comprising a sample carrying article being layered with a light reflecting layer, said light reflecting layer being for allowing an optical collection and detection system to collect both luminescent light emitted from said sample positioned on the light reflecting article in a direction of said optical collection and detection system, as well as luminescent light emitted from said sample in a direction away from said optical collection and detection system and reflected in the direction of said optical collection and detection system via said light reflecting layer, thereby increasing a sensitivity of luminescent light detection, wherein the light reflecting article is a microscopic slide.

2. The light reflecting article of claim 1, wherein said light reflecting layer includes a stack of thin light reflecting films.

3. The light reflecting article of claim 1, wherein said light reflecting layer provides spectral reflection selected from the group consisting of a single band reflection, a double band reflection, a triple band reflection a multiple band reflection, a longpass reflection and a shortpass reflection.

4. A light reflecting article comprising a sample carrying article being layered with a light reflecting layer, said light reflecting layer being for allowing an optical collection and detection system to collect both luminescent light emitted from said sample positioned on the light reflecting article in a direction of said optical collection and detection system, as well as luminescent light emitted from said sample in a direction away from said optical collection and detection system and reflected in the direction of said optical collection and detection system via said light reflecting layer, thereby increasing a sensitivity of luminescent light detection, wherein the light reflecting article is a chip to which biological material is bound.

5. The light reflecting article of claim 4, wherein said biological material is selected from the group consisting of cells, phages, bacteria, nucleic acids, proteins, peptides and carbohydrates.

6. The light reflecting article of claim 4, wherein said biological material is bound to said chip in array.

7. A light reflecting article comprising a sample carrying article being layered with a light reflecting layer, said light reflecting layer being for allowing an optical collection and detection system to collect both luminescent light emitted from said sample positioned on the light reflecting article in a direction of said optical collection and detection system, as well as luminescent light emitted from said sample in a direction away from said optical collection and detection system and reflected in the direction of said optical collection and detection system via said light reflecting layer, thereby increasing a sensitivity of luminescent light detection, wherein the light reflecting article is a lab-on-chip device having a plurality of micro-vessels.

8. A light reflecting article comprising a sample carrying article being layered with a light reflecting layer, said light reflecting layer being for allowing an optical collection and detection system to collect both luminescent light emitted from said sample positioned on the light reflecting article in a direction of said optical collection and detection system, as well as luminescent light emitted from said sample in a direction away from said optical collection and detection system and reflected in the direction of said optical collection and detection system via said light reflecting layer, thereby increasing a sensitivity of luminescent light detection, wherein the light reflecting article forms a part of a microscope stage.

9. A light reflecting article comprising a sample carrying article being layered with a light reflecting layer, said light reflecting layer being for allowing an optical collection and detection system to collect both luminescent light emitted from said sample positioned on the light reflecting article in a direction of said optical collection and detection system, as well as luminescent light emitted from said sample in a direction away from said optical collection and detection system and reflected in the direction of said optical collection and detection system via said light reflecting layer, thereby increasing a sensitivity of luminescent light detection, wherein said light reflecting layer includes a mirror layer.

10. A light reflecting article comprising a sample carrying article being layered with a light reflecting layer, said light reflecting layer being for allowing an optical collection and detection system to collect both luminescent light emitted from said sample positioned on the light reflecting article in a direction of said optical collection and detection system, as well as luminescent light emitted from said sample in a direction away from said optical collection and detection system and reflected in the direction of said optical collection and detection system via said light reflecting layer, thereby increasing a sensitivity of luminescent light detection, wherein said light reflecting layer includes an array of micro-retro-reflectors.

11. A method of increasing a sensitivity of an optical collection and detection system in detecting luminescent light emitted from a sample, the method comprising positioning the sample on a light reflecting article, such that the optical collection and detection system collects both luminescent light emitted from a sample positioned on said light reflecting article in a direction of said optical collection and detection system, as well as luminescent light emitted from said sample in a direction away from said optical collection and detection system and reflected in the direction of said optical collection and detection system via said light reflecting article, thereby increasing a sensitivity of luminescent light detection, wherein said light reflecting article includes a sample carrying article layered with a light reflecting layer, and said light reflecting article is a microscopic slide.

12. A method of increasing a sensitivity of an optical collection and detection system in detecting luminescent light emitted from a sample, the method comprising positioning the sample on a light reflecting article, such that the optical collection and detection system collects both luminescent light emitted from said sample positioned on said light reflecting article in a direction of said optical collection and detection system, as well as luminescent light emitted from said sample in a direction away from said optical collection and detection system and reflected in the direction of said optical collection and detection system via said light reflecting article, thereby increasing a sensitivity of luminescent light detection, wherein said light reflecting article includes a sample carrying article layered with a light reflecting layer, and said light reflecting article is a chip to which biological material is bound.

13. The method of claim 12, wherein said biological material is selected from the group consisting of cells, phages, bacteria, nucleic acids, proteins, peptides and carbohydrates.

14. The method of claim 12, wherein said biological material is bound to said chip in array.

15. A method of increasing a sensitivity of an optical collection and detection system in detecting luminescent light emitted from a sample, the method comprising positioning the sample on a light reflecting article, such that the optical collection and detection system collects both luminescent light emitted from said sample positioned on said light reflecting article in a direction of said optical collection and detection system, as well as luminescent light emitted from said sample in a direction away from said optical collection and detection system and reflected in the direction of said optical collection and detection system via said light reflecting article, thereby increasing a sensitivity of luminescent light detection, wherein said light reflecting article includes a sample carrying article layered with a light reflecting layer, and said light reflecting article is a lab-on-chip device having a plurality of micro-vessels.

16. A method of increasing a sensitivity of an optical collection and detection system in detecting luminescent light emitted from a sample, the method comprising positioning the sample on a light reflecting article, such that the optical collection and detection system collects both luminescent light emitted from said sample positioned on said light reflecting article in a direction of said optical collection and detection system, as well as luminescent light emitted from said sample in a direction away from said optical collection and detection system and reflected in the direction of said optical collection and detection system via said light reflecting article, thereby increasing a sensitivity of luminescent light detection, wherein said light reflecting article includes a sample carrying article layered with a light reflecting layer, and said light reflecting article forms a part of a microscope stage.

17. A method of increasing a sensitivity of an optical collection and detection system in detecting luminescent light emitted from a sample, the method comprising positioning the sample on a light reflecting article, such that the optical collection and detection system collects both luminescent light emitted from said sample positioned on said light reflecting article in a direction of said optical collection and detection system, as well as luminescent light emitted from said sample in a direction away from said optical collection and detection system and reflected in the direction of said optical collection and detection system via said light reflecting article, thereby increasing a sensitivity of luminescent light detection, wherein said light reflecting article includes a sample carrying article layered with a light reflecting layer, and said light reflecting layer includes a mirror layer.

18. A method of increasing a sensitivity of an optical collection and detection system in detecting luminescent light emitted from a sample, the method comprising positioning the sample on a light reflecting article, such that the optical collection and detection system collects both luminescent light emitted from said sample positioned on said light reflecting article in a direction of said optical collection and detection system, as well as luminescent light emitted from said sample in a direction away from said optical collection and detection system and reflected in the direction of said optical collection and detection system via said light reflecting article, thereby increasing a sensitivity of luminescent light detection, wherein said light reflecting article includes a sample carrying article layered with a light reflecting layer, and said light reflecting layer includes an array of micro-retro-reflectors.

19. A method of increasing a sensitivity of an optical collection and detection system in detecting luminescent light emitted from a sample, the method comprising positioning the sample on a light reflecting article, such that the optical collection and detection system collects both luminescent light emitted from said sample positioned on said light reflecting article in a direction of said optical collection and detection system, as well as luminescent light emitted from said sample in a direction away from said optical collection and detection system and reflected in the direction of said optical collection and detection system via said light reflecting article, thereby increasing a sensitivity of luminescent light detection, wherein said light reflecting article includes a sample carrying article layered with a light reflecting layer, and said light reflecting layer includes a stack of thin light reflecting films.

20. A method of increasing a sensitivity of an optical collection and detection system in detecting luminescent light emitted from a sample, the method comprising positioning the sample on a light reflecting article, such that the optical collection and detection system collects both luminescent light emitted from said sample positioned on said light reflecting article in a direction of said optical collection and detection system, as well as luminescent light emitted from said sample in a direction away from said optical collection and detection system and reflected in the direction of said optical collection and detection system via said light reflecting article, thereby increasing a sensitivity of luminescent light detection, wherein said light reflecting article includes a sample carrying article layered with a light reflecting layer, and said light reflecting layer provides spectral reflection selected from the group consisting of a single band reflection, a double band reflection, a triple band reflection a multiple band reflection, a longpass reflection and a shortpass reflection.

21. A method of increasing a sensitivity of an optical collection and detection system in detecting luminescent light emitted from a sample, the method comprising positioning the sample on a light reflecting article, such that the optical collection and detection system collects both luminescent light emitted from said sample positioned on said light reflecting article in a direction of said optical collection and detection system, as well as luminescent light emitted from said sample in a direction away from said optical collection and detection system and reflected in the direction of said optical collection and detection system via said light reflecting article, thereby increasing a sensitivity of luminescent light detection, wherein said optical collection and detection system is selected from the group consisting of a fluorescence microscope and a confocal microscope.

22. A method of increasing a sensitivity of an optical collection and detection system in detecting luminescent light emitted from a sample, the method comprising positioning the sample on a light reflecting article, such that the optical collection and detection system collects both luminescent light emitted from said sample positioned on said light reflecting article in a direction of said optical collection and detection system, as well as luminescent light emitted from said sample in a direction away from said optical collection and detection system and reflected in the direction of said optical collection and detection system via said light reflecting article, thereby increasing a sensitivity of luminescent light detection, wherein said optical collection and detection system includes a scanable light source.

23. The method of claim 22, wherein said scanable light source emits coherent light.

24. A method of increasing a sensitivity of an optical collection and detection system in detecting luminescent light emitted from a sample, the method comprising positioning the sample on a light reflecting article, such that the optical collection and detection system collects both luminescent light emitted from said sample positioned on said light reflecting article in a direction of said optical collection and detection system, as well as luminescent light emitted from said sample in a direction away from said optical collection and detection system and reflected in the direction of said optical collection and detection system via said light reflecting article, thereby increasing a sensitivity of luminescent light detection, wherein said optical collection and detection system includes an arc lamp.

25. A method of increasing a sensitivity of an optical collection and detection system in detecting luminescent light emitted from a sample, the method comprising positioning the sample on a light reflecting article, such that the optical collection and detection system collects both luminescent light emitted from said sample positioned on said light reflecting article in a direction of said optical collection and detection system, as well as luminescent light emitted from said sample in a direction away from said optical collection and detection system and reflected in the direction of said optical collection and detection system via said light reflecting article, thereby increasing a sensitivity of luminescent light detection, wherein said optical collection and detection system includes a laser light source.

26. A method of increasing a sensitivity of an optical collection and detection system in detecting luminescent light emitted from a sample, the method comprising positioning the sample on a light reflecting article, such that the optical collection and detection system collects both luminescent light emitted from said sample positioned on said light reflecting article in a direction of said optical collection and detection system, as well as luminescent light emitted from said sample in a direction away from said optical collection and detection system and reflected in the direction of said optical collection and detection system via said light reflecting article, thereby increasing a sensitivity of luminescent light detection, wherein said luminescent light emitted from the sample originates from autofluorescence of said sample.

27. A method of increasing a sensitivity of an optical collection and detection system in detecting luminescent light emitted from a sample, the method comprising positioning the sample on a light reflecting article, such that the optical collection and detection system collects both luminescent light emitted from said sample positioned on said light reflecting article in a direction of said optical collection and detection system, as well as luminescent light emitted from said sample in a direction away from said optical collection and detection system and reflected in the direction of said optical collection and detection system via said light reflecting article, thereby increasing a sensitivity of luminescent light detection, wherein said luminescent light emitted from the sample originates from a fluorescent probe interacting with said sample.

28. The method of claim 27, wherein said fluorescent probe includes a first member of a binding pair conjugated to a fluorescent tag.

29. The method of claim 28, wherein said first member of said binding pair is selected from the group consisting of a nucleic acid, a ligand, a receptor, an antigen, an antibody, an enzyme, a substrate, a substrate analog and an inhibitor.

30. The method of claim 28, wherein said fluorescent tag is selected from the group consisting of a fluorochrome, a quantum dot, a nanocrystal and a fluorescent protein.

31. A method of increasing a sensitivity of an optical collection and detection system in detecting luminescent light emitted from a sample, the method comprising positioning the sample on a light reflecting article, such that the optical collection and detection system collects both luminescent light emitted from said sample positioned on said light reflecting article in a direction of said optical collection and detection system, as well as luminescent light emitted from said sample in a direction away from said optical collection and detection system and reflected in the direction of said optical collection and detection system via said light reflecting article, thereby increasing a sensitivity of luminescent light detection, wherein said luminescent light emitted from the sample originates from a chemifluorescent probe interacting with said sample, and said chemifluorescent probe changes an intensity of its emission according to a concentration of a chemical present in the sample.

32. A method of increasing a sensitivity of an optical collection and detection system in detecting luminescent light emitted from a sample, the method comprising positioning the sample on a light reflecting article, such that the optical collection and detection system collects both luminescent light emitted from said sample positioned on said light reflecting article in a direction of said optical collection and detection system, as well as luminescent light emitted from said sample in a direction away from said optical collection and detection system and reflected in the direction of said optical collection and detection system via said light reflecting article, thereby increasing a sensitivity of luminescent light detection, wherein said luminescent light emitted from said sample includes a plurality of emission spectra.

33. A method of increasing a sensitivity of an optical collection and detection system in detecting luminescent light emitted from a sample, the method comprising positioning the sample on a light reflecting article, such that the optical collection and detection system collects both luminescent light emitted from said sample positioned on said light reflecting article in a direction of said optical collection and detection system, as well as luminescent light emitted from said sample in a direction away from said optical collection and detection system and reflected in the direction of said optical collection and detection system via said light reflecting article, thereby increasing a sensitivity of luminescent light detection, wherein said luminescent light emitted from said sample includes a plurality of emission spectra originating from combinatorial fluorescence labeling.

* * * * *